March 26, 1968   J. ULDERUP   3,375,027
UNIVERSAL JOINT CONSTRUCTION HAVING HOUSING OF EPOXY RESIN
Filed March 24, 1965
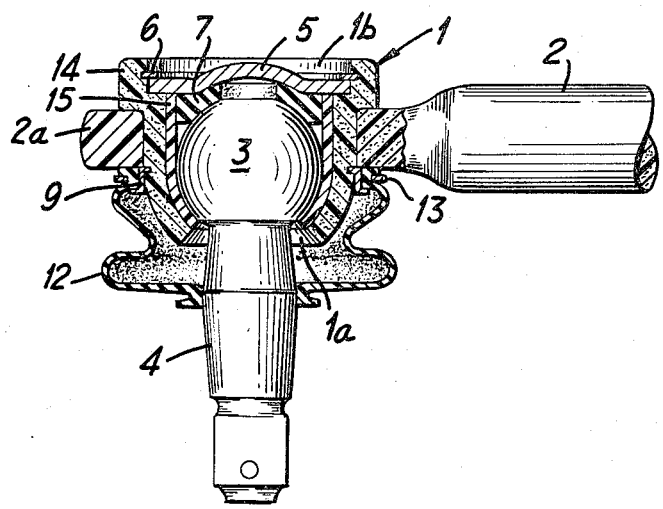
INVENTOR.
JÜRGEN ULDERUP
BY
*McGlew & Toren*
ATTORNEYS.

United States Patent Office 3,375,027
Patented Mar. 26, 1968

3,375,027
UNIVERSAL JOINT CONSTRUCTION HAVING HOUSING OF EPOXY RESIN
Jürgen Ulderup, Bergstrasse, Lemforde, Hannover, Germany
Filed Mar. 24, 1965, Ser. No. 442,427
Claims priority, application Germany, Apr. 24, 1964, U 10,676
5 Claims. (Cl. 287—90)

ABSTRACT OF THE DISCLOSURE

The construction of a universal joint is disclosed herein in respect to a single embodiment. The universal joint includes a housing forming a socket for supporting a hinge pin for universal pivotal movement. The universal joint is provided for connecting steering linkages as well as axle and guide elements of motor vehicles, and in accordance with the invention the housing is formed of an epoxy resin material to which hardeners have been added, that is, chemical substances which are connected with the epoxy resin as a reaction partner by poly-addition or by polymerization into a high molecular spatially cross-linked state. In addition to the chemical hardners, fillers are added to the epoxy resin in order to improve the mechanical properties of the end product such as the hardeners, the abrasion resistance and thermal resistance. For such purpose, mineral materials such as quartz or ground shell, chalk, sand and materials in fiber form such as glass fibers are added.

In accordance with a further feature of the invention, the housing is formed with an annular indentation in order to provide a support for a ring member which tightly secures a linkage member around the housing in a position against a shoulder formation at the top thereof. In addition, the annular ring member supports one end of a boot seal which is engaged at its opposite end around the body portion of the hinge pin of the universal joint.

The universal joint housing produced in accordance with the invention is characterized by high mechanical strength and is thus excellently suitable for replacing conventional steel housings or plastic housings which have been reinforced by metal inserts. The housings also provide excellent resistance to grease and other harmful substances. It may be cast and will have a characteristic of high stability in dimension and form.

Summary of the invention

This invention relates in general to the construction of universal joints for linkages of all kinds, and in particular, to a new and useful universal joint having a housing of improved material and construction.

The invention is particularly directed to universal joints for linkages which include a pivot pin having a ball-shaped end which is universally movable within a housing. Such joints are primarily employed for connecting steering linkages as well as axle and guide elements in motor vehicles.

Attempts have been made to make various parts of such a joint of a plastic material, but it has not been possible to form the housing of such a joint with a plastic material due to the high forces which act thereon. For this reason, the known plastic housings are always equipped with metal reinforcements which completely or partly enclose the plastic of the housing in the form of rings, jackets, shells and the like which are embedded in the plastic. It was only in this way that it was possible to impart to the plastic housing sufficient strength to be able to absorb the high stresses appearing particularly on the wheel guide elements when the joint is employed for such purpose without risking the premature destruction of the housing and thus of the entire joint.

Because the housing must be of a durable and strong construction, it is very difficult and complicated to manufacture. Special care must be taken that the metal inserts are always firmly anchored with the plastic other housing. This must be taken into consideration both in the design of the housing and of the supporting inserts. The tools used for molding are thus also complicated, and the method of forming these parts is very involved and expensive.

In accordance with the present invention the disadvantages of the prior art construction have been overcome by providing a joint housing which may be formed of an epoxy resin mixed with hardeners (i.e. chemical substances which are connected with the epoxy resin as a reaction partner by polyaddition or polymerization into a high-molecular spatially cross-linked state) to which fillers (i.e. materials of mineral origin with which the mechanical properties of the end product, such as hardness, abrasion, thermal resistance be improved) have been preferably added such as quartz or ground shell, chalk, sand or similar substances, particularly in fiber form, for example, glass fibers. The universal joint housing produced in accordance with the present invention is characterized by high mechanical strength and is thus excellently suitable to replace the conventional steel housings as well as the known plastic housings which have been reinforced heretofore by expensive metal inserts. The resistance of these housings to grease and other harmful substances is excellent. A further advantage of the housing construction of the present invention is that it may be cast and will have characteristics of higher stability in dimension and form. The housings can therefore be produced by non-cutting shaping without time-consuming finishing of the molded part so that the manufacturing costs are materially reduced.

A feature of the construction is that the housing is formed of a molded resin material by mixing additional materials such as hardeners to achieve an optimum mechanical property for each individual case. In this way, it is possible to produce housings which are characterized, among other things, by great impact strength and compressive strength. In a preferred development of the invention it has been found possible to make the connecting linkage integral with the housing and advantageously formed in a single molded piece. In some instances, however, it is still preferable to produce the housing and the connecting rod in separate parts and both parts can be joined with each other after hardening mechanically in an easy and permanent manner due to their great strength. This can preferably be effected so that a horizontal collar is provided on the upper edge of the joint housing and a circumferential groove is produced in the region below the collar for connection of the housing to the connecting linkage by means of a flexible covering or packing element. With this simple construction anchoring of the housing in respect to the articulated pin which has the ball member riding in the housing and the connecting linkage can be effected in a simple and easy manner so that the housing becomes fixed in both directions.

In accordance with another feature of the invention it is possible to add wear-reducing agents, such as graphite, for example, to the epoxy resins before they are shaped and hardened into the housing configuration. But, in addition, other layers of materials having relatively low friction or good sliding characteristics may also be incorporated within the housing structure for supporting the ball member of the pivotal element. By making the housing of a plastic material in accordance with the invention it is possible not only to have a strong joint, but also one which is made of sound-absorbent materials so that the road noises are not passed on to the interior of the vehicle.

Accordingly, it is an object of this invention to provide an improved universal joint construction including a housing which is made of a hardenable plastic material.

A further object of the invention is to provide a universal joint construction including an outer plastic housing which is adapted to be connected to a connecting linkage, and a pin member having a ball element which is articulated within the housing and wherein the housing is molded to form an exterior groove for the connection of a covering member between the housing and the pin member which carries the ball element in a simple and easy manner.

A further object of the invention is to provide a universal joint which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

In the drawing, the only figure of the drawing is a transverse sectional view through a universal joint construction in accordance with the invention.

Referring to the drawing in particular, the invention embodied therein comprises a universal joint which includes a housing generally designated 1 made in accordance with the invention, and a connecting pin or linkage member 2 which is connected with, or formed integrally with, the housing 1. The housing 1 is hollow and has an opening 1a at one end for receiving a ball element or spherical end 3 of a universally movable member or hinge pin 4. The housing 1 is formed with an open top end 1b which is closed by a cover 5 which is held in position by a snap ring 6. In the embodiment illustrated, the cover ring 5 is a sheet iron stamping, but, of course, it may be made of other similar material such as plastic in the same manner as the housing. A resilient element or a spring member 7 is held between the cover 5 and the ball end 3 of the pin 4. The elastic element 7 is usually positioned within the housing under an initial stress which affects, in accordance with the amount of tension, the adjustment of the joint.

In accordance with a feature of the invention, the housing 1 and the linkage member 200 is formed of an epoxy resin to which hardeners (i.e. chemical substances which are connected with the epoxy resin as a reaction partner by polyaddition or polymerization into a high-molecular spatially cross-linked state) have been added in order to increase the mechanical strength thereof. In addition, fillers (i.e. materials of mineral origin with which the mechanical properties of the end product, such as hardness, abrasion, thermal resistance be improved), such as quartz and ground shell, chalk, sand, and similar substances are embedded in the latter, preferably in a fibrous form or preferably in the form of glass fibers. A feature of the construction is that the housing 1 is provided with an upper collar portion 14 of greater dimension against which the upper portion of an encircling ring portion 2a of the connecting linkage pin 2 abuts. The housing 1 is also formed with an annular recess or groove for accommodating one end of a substantially Z-shaped cross section ring member 9 directly below the lower face of the ring portion 2a of the connecting linkage 2. The ring member 9 forms ring means for positioning the connecting linkage member 2 against the collar portion 14 of the housing 1 and also provides means for locating the upper end of the boot seal 12. The outer lower portion of the Z-shaped ring 9 forms a seat for an upper end of a boot sel or cover member 12 which is clamped thereon by a clamping ring 13. The gasket member 12 also forms a lower abutting surface for the ring portion 2a. The lower end of the boot seal 12 is secured to the universal member 4, and thus the housing is anchored both in respect to the universal member 4 and the connecting linkage member 2. In some instances it is preferable that the housing 1 and the connecting link member 2 be made of a single piece, so that a subsequent interconnection of these two parts is not necessary. In the represented embodiment, however, it is a simple matter to slide the housing 1 into the ring portion 2a and to hold it in position by setting the Z-shaped member 9 into the groove of the housing 1 and then applying the gasket 12 and the ring 13. In the embodiment illustrated it is advantageous to employ a bearing box or an insert 15 of a material of relatively low friction or sliding characteristics between the interior of the housing and the ball member 3.

While a specific embodiment of the invention has been shown and described in detail to illustrate the application of the inventive principles, it will be understood that the invention may be embodied otherwise without departing from such principles.

What is claimed is:

1. A universal joint, particularly for the connection of steering linkages, wheel guide elements and similar components in motor vehicles, comprising a tubular housing, a connecting link member connected to said housing and extending outwardly from a side thereof, a hinge member extending into one end of said housing and having an enlarged ball-shaped portion universally movable therein, a boot seal connected between said hinge member and said housing, said housing and said connecting link being made of an epoxy resin material having hardeners (i.e. chemical substances which are connected with the epoxy resin as a reaction partner by polyaddition or polymerization into a high-molecular spatially cross-linked state) and mechanical filler material therein to improve hardness, abrasion resistance and thermal stability, said housing having a widened upper portion forming a collar, said connecting link including a ring portion extending around said housing and abutting on its upper surface on its one side against said collar, and a positioning ring engaged in the exterior wall of said housing below the ring portion of said connecting link member for positioning said link member in respect to said housing.

2. A universal joint, particularly for the connection of steering linkages, wheel guide elements and similar components in motor vehicles, comprising a tubular housing, a connecting link member connected to said housing and extending outwardly from a side thereof, a hinge member extending into one end of said housing and having an enlarged ball-shaped portion universally movable therein, a boot seal connected between said hinge member and said housing, said housing and said connecting link being made of an epoxy resin material having hardeners (i.e. chemical substances which are connected with the epoxy resin as a reaction partner by polyaddition or polymerization into a high-molecular spatially cross-linked state) and mechanical filler material therein to improve hardness, abrasion resistance and thermal stability, said housing having a widened upper portion forming a collar, said connecting link including a ring portion extending around said housing and abutting on its upper surface on its one side against said collar, said boot seal being secured at one end to said hinge member and having an oppoiste end surrounding said housing directly below the ring portion of said connecting link member, and clamping ring means holding said boot seal to said housing.

3. A universal joint comprising a tubular housing open at each end, a cover closing one end of said housing, a hinge member extending into the opposite end of said housing and having an enlarged ball-shaped portion universally movable therein, resilient means disposed between said ball-shaped portion and said cover, a connecting link member including an annular portion extending around the exterior of said housing, said housing having a widened portion defining a collar against which said annular portion abuts, said housing also having an annular groove defined below the ring portion of said connecting link member, a substantially Z-shaped section connecting ring having one projecting end disposed in the groove of said housing and having an opposite projecting end extending outwardly from said housing and forming a supporting bridge, a boot seal connected to said hinge member and having a portion surrounding said housing resting on said supporting bridge of said Z-sectioned ring member, and a clamping ring clamping said boot seal over said Z-sectioned clamping ring.

4. A universal joint comprising a tubular housing open at each end made of a reinforced plastic material, a cover closing one end of said housing, a hinge member extending into the opposite end of said housing and having an enlarged ball-shaped portion universally movable therein, resilient means disposed between said ball-shaped portion and said cover, a connecting link member including an annular portion extending around the exterior of said housing, said housing having a widened portion defining a collar against which said annular portion abuts, said housing also having an annular groove defined below the ring portion of said connecting link member, a substantially Z-shaped section connecting ring having one end disposed in the groove of said housing and having an opposite end extending outwardly from said housing and forming a supporting bridge, a boot seal connected to said hinge member and having a portion surrounding said housing resting on the supporting bridge of said Z-sectioned ring member, and a clamping ring clamping said foot seal over said Z-sectioned clamping ring.

5. A universal joint, particularly for the connection of steering linkages, wheel guide elements and similar components in motor vehicles, comprising a tubular housing, a connecting link member connected to said housing and extending outwardly from a side thereof, a hinge member extending into one end of said housing and having an enlarged ball-shaped portion universally movable therein, a boot seal connected between said hinge member and said housing, said housing being made of an epoxy resin material having hardeners (i.e. chemical substances which are connected with the epoxy resin as a reaction partner by polyaddition or polymerization into a high-molecular spatially cross-linked state) and mechanical filler material therein to improve hardness, abrasion resistance and thermal stability, said housing having a widened upper portion forming a collar, said connecting link being made of a hardened plastic material and including a ring portion extending around said housing and abutting on its upper surface on its one side against said collar, a ring engaged in the exterior wall of said housing below the ring portion of said connecting link member for positioning said link member in respect to said housing, said boot seal being secured at one end to said hinge member and having an opposite end surrounding said housing directly below the ring portion of said connecting link member, and a clamping ring extending around and holding said boot seal to said housing.

References Cited

UNITED STATES PATENTS

| | | | |
|---|---|---|---|
| 2,701,907 | 2/1955 | Heim | 29—149.5 |
| 2,931,477 | 4/1960 | Metzgar | 308—238 XR |
| 3,024,050 | 3/1962 | Moskovitz | 287—90 |
| 3,056,709 | 10/1962 | Rising et al. | |
| 3,155,014 | 11/1964 | Genz. | |

FOREIGN PATENTS 1,014,441   8/1957   Germany.

CARL W. TOMLIN, *Primary Examiner.*

ANDREW KUNDRAT, *Assistant Examiner.*